(12) United States Patent
Imai et al.

(10) Patent No.: US 6,587,415 B1
(45) Date of Patent: Jul. 1, 2003

(54) DRIVE UNIT HAVING BLANK/WRITTEN AREA IDENTIFICATION CAPABILITY

(75) Inventors: Mitsugu Imai, Kanagawa (JP); Masayoshi Nagata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/542,758

(22) Filed: Apr. 4, 2000

(30) Foreign Application Priority Data

Apr. 5, 1999 (JP) ............................................. 11-097503

(51) Int. Cl.[7] .................................................. G11B 5/58
(52) U.S. Cl. ................................................... 369/53.22
(58) Field of Search ...................... 369/53.22, 53.24, 369/53.31, 53.35, 116, 44.31, 44.34, 44.28, 44.26, 275.1, 275.2, 275.3

(56) References Cited

U.S. PATENT DOCUMENTS 5,781,567 A * 7/1998 Sako et al. ................. 714/762

* cited by examiner

Primary Examiner—William Korzuch
Assistant Examiner—Kimlien T. Le
(74) Attorney, Agent, or Firm—Frommer Lawrence & Haug LLP; William S. Frommer; Glenn F. Savit (57) ABSTRACT

A result of a blank/written identification performed concurrently with decoding is verified when an error occurs during decoding of read information, and retry is performed according to this identification result in order to achieve fast retry operation. Specifically, a blank check is performed concurrently with decoding of readout data so that when a decoding error occurs, the blank check status can be immediately identified. In this way, suitable retry operations can be undertaken.

4 Claims, 8 Drawing Sheets

DRIVE UNIT HAVING BLANK/WRITTEN AREA IDENTIFICATION CAPABILITY

BACKGROUND OF THE INVENTION

1. Field of the Invention

This invention relates to a drive unit which can perform recording and reproduction of data on a recording medium.

2. Description of the Related Art

Operations which read, decode and perform error correction on written information are carried out not only during normal reproduction from a recording medium such as a magneto-optic disk, but also at the time of so-called write-and-verify.

Write-and-verify is an operation which reads recorded data immediately after a recording operation, and checks whether the data was recorded correctly.

However, when information is read and decoded during reproduction and verification, errors may occur which are impossible to correct.

In such a case, a retry operation, such as re-reading a sector where the error occurred (a sector being a data unit on a disk, described later), is performed.

However, if an error occurs during decoding, an operation is performed before starting the read retry which checks whether data recording on the sector is complete (hereafter, referred to as "written" status) or whether data recording has not taken place (hereafter, referred to as "blank" status).

This is because the causes of decoding errors such as ECC errors and the retry methods that should be performed depend on the written/blank status of the sector.

For example, if the sector is blank when a read error occurs during write-and-verify, there is a strong possibility that not the read-operation, but the write operation was not perfomed correctly. On the other hand, if the sector is blank when a read error occurs during normal reproduction, an error will naturally occur and a read retry operation is unnecessary.

In order to make such a determination, a validation (hereafter, referred to as "blank check") of the written/blank status of a sector is required. However, since a read had to be repeated on the sector where the error occurred to perform this blank check, it was necessary to wait for the time of at least one disk rotation after the error occurred. This delayed the start of the retry action, and as a result, the information reading speed of the drive unit decreased.

Due to the need to perform a blank check, to retry reading a certain sector once, two reads (two accesses of the sector by the head) are required, i.e., one read for the blank check and one read for the retry). Consequently the time required for one retry operation was long, and the upper limit on the number of retries that could be made was used up. For example, if an error re-occurs when a retry read is performed, another retry has to be performed, but since there is an upper limit to the number of retries that can be made, it will be impossible to read the data if it cannot be successfully decoded by the time this upper limit is reached. The upper limit is set considering the time required to make retries, and it a long time is required for one retry, the upper limit will have to be set to a low number. However if the upper limit is low, the probability of a successful read by retry will fall, and this will limit the reading performance of the drive unit.

SUMMARY OF THE INVENTION

It is therefore an object of this invention to perform suitable retries rapidly in a short time.

For this purpose, the drive unit of this invention comprises a head means which reads information from a recording medium, a decoding means which performs decoding and error correction corresponding to a modulation scheme on information read by the head means, an identifying means which identifies whether this information comes from a written area or a blank area on the recording medium when the information read by the head means is decoded by the decoding means, and a control means which checks the identification result from the identifying means and performs a retry operation according to this identification result when an error occurs during decoding by the decoding means.

In other words, a blank check is performed simultaneously by the identifying means when the read data is decoded, and if a decoding error occurs, a suitable retry action is rapidly begun by immediately identifying the blank check status.

According to this invention, it the identification result from the identifying means is a blank area, decoding by the decoding means is stopped. In other words, in the case of a blank area, error correction is not performed needlessly.

DESCRIPTION OF THE PREFERRED EMBODIMENTS

A drive unit which performs recording and playback on a magneto-optic (MO) disk will now be described as one embodiment of this invention.

The description will be given in the following order.

1. MO disk
2. Construction of drive unit
3. Processing performed during readout of data

1. MO Disk

Firstly, the MO disk used as a recording medium in the drive unit of this example will be described.

On this MO disk, data sequences formed on the tracks of the disk are comprised of continuous units known as sectors.

Figure 8A:
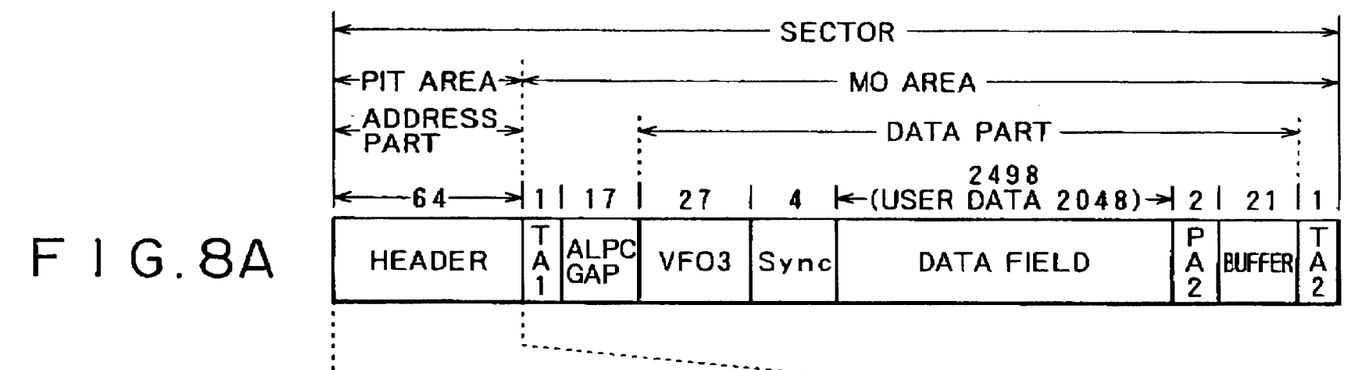
FIGS. 8A and 8B are descriptive diagrams of the sector formatting of an MO disk.
Figure 8B:
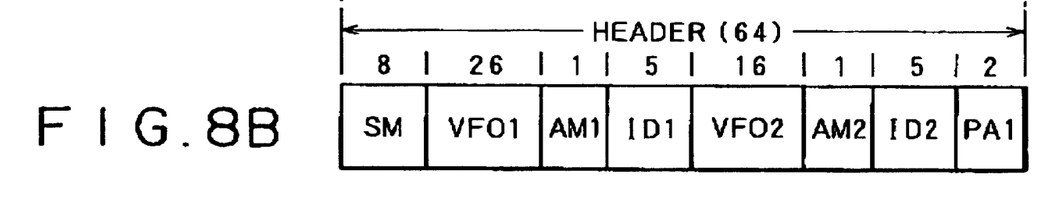

One example of the formatting sequence of one sector is shown in FIG. 8, and broadly can be separated into a header and an MO area.

The header is a read-only area in which data, for example an address, described later, is recorded by an "emboss pit".

The MO area is an area which permits magneto-optical recording/reproduction of user data or the like.

The MO area can also be an area formed by an MSR recording film wherein data is reproduced by the MSR reproducing scheme.

Figures 7A, 7B:
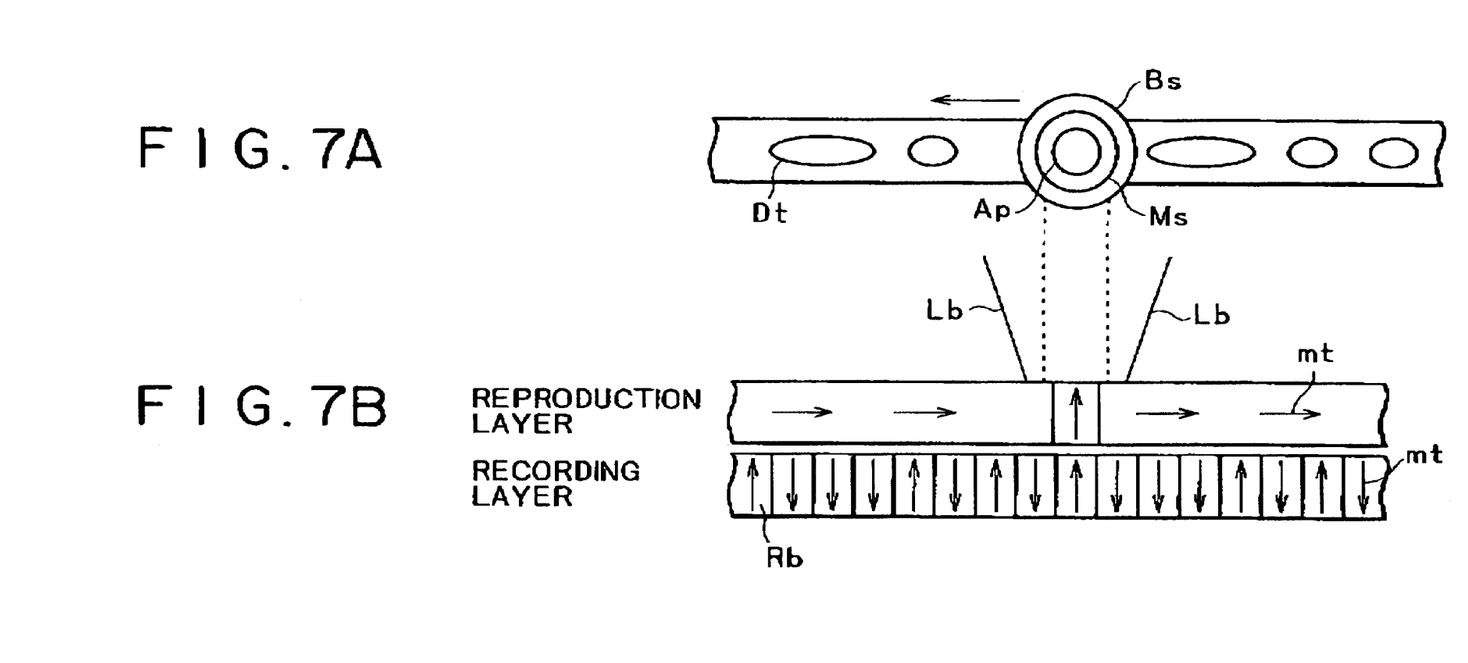
FIGS. 7A and 7B are descriptive diagrams of the MSR reproduction scheme.

The MSR (magnetic super resolution) reproducing scheme is described in FIGS. 7A, 7B.

FIG. 7A shows a recording track Dt and a laser beam spot Bs which irradiates it from above. FIG. 7B shows a partial section of the magneto-optic disk.

To obtain the MSR effect, the magneto-optic disk must comprise a recording layer and a reproduction layer which have different magnetic properties depending on the temperature, as shown in FIG. 7B. The reproduction layer acts as a mask Ms which masks the recording layer from the beam spot Bs of a laser beam Lb.

As can be seen from FIGS. 7A, 7B, a small window (aperture Ap) is formed on the reproduction layer by irradiating it with reproducing laser power, and a magnetic orientation mt of a recording bit Rb in the lower recording layer is transferred to this aperture Ap. By observing the magnetic orientation mt transferred to this reproduction layer, the recording bits Rb which are recorded at high density can be read even by a laser beam Lb of large spot diameter.

Hence, by irradiating with the laser beam Lb which has reproducing laser power, the magnetic orientation mt is transferred from the recording layer to the reproduction layer, and as the size of the aperture Ap, i.e., the surface area across which information is transferred from the recording layer to the reproduction layer, can be controlled by the reproducing laser power at that time, the frequency characteristics of the signal reproduced from the disk can be extended by suitably controlling the reproducing laser power.

By using this MSR technique, even with a beam spot diameter identical to that of the prior art, for example, a high recording/reproduction density of two or more times can be obtained.

Next, the actual sector formatting of the MO disk will be described referring to FIGS. 8A, 8B.

On the magneto-optic disk, user data is recorded in recording/reproduction sector units.

In recording/reproduction sequence, one sector may be divided into a header, transition area TA1, ALPC gap, VFO3, sync, data field, postamble PA2, buffer and transition area TA2, as shown in FIG. 8A. The numbers in the drawing are numbers of bytes Thus, one sector may be broadly divided into an address part (i.e., header) and a data part, an ALPC gap and transition areas TA1, TA2 arranged before and after the data part.

The header is a read-only area which is preformatted and recorded by an "emboss pit", and the area apart from the header, i.e., the interval from the transition area TA1 to the transition area TA2 is the MO area.

In this MO area, the MSR effect described in FIGS. 7A, 7B is obtained.

FIG. 8B shows an enlargement of a 64 byte header which is the address part. The header comprises a sector mark SM (8 bytes), VFO field VFO1 (26 bytes), address mark AM1 (one byte), ID field ID1 (5 bytes), VFO field VFO2 (16 bytes), address mark AM2 (one byte), ID field ID2 (5 bytes), and postamble PA1 (one byte) arranged in sequence.

The sector mark SM is a mark for identifying the start of the sector, wherein a pattern which does not normally occur in recording data is formed by embossing.

The VFO fields in one sector are for synchronizing a VFO (Variable Frequency Oscillator) in a PLL part of the recording/reproduction unit, described later, and comprise VFO1, VFO2 and VFO3. In other words, these are PLL lead-in areas.

VFO1 and VFO2 are formed by embossing in the address part.

VFO3 is provided in the data part as shown in FIG. 8A, and is recorded magneto-optically when the sector is recorded.

In VFO1, VFO2, a predetermined pattern signal is recorded to lead in a PLL (generate a reproduction clock) and read out data (the address) in the header. On the other hand, in VFO3, a predetermined pattern signal is recorded to lead in a PLL (generate a reproduction clock) and read out data in the data part. For example, VFO3 may comprise a pattern (2T pattern) in which "0" and "1" channel bits appear alternately. Therefore, if the time corresponding to a time length of one channel bit is T, a reproduced signal having a level which inverts every 2T is obtained when the VFO field is reproduced.

The address mark AM is used to give the unit byte synchronization for the subsequent ID field, and it has a predetermined pattern.

The ID fields comprise the sector address, i.e., a track number and a sector number, and a CRC byte for performing error detection on this information.

The 5 byte ID fields ID1, ID2 which comprise the sector address therefore have identical data. In other words, the address is recorded twice in one sector.

The postamble PA1 in the header and PA2 in the data part respectively have predetermined patterns.

In FIG. 8A, the ALPC gap which is disposed after the transition area TA1 following the header is intended to ensure that the unit has sufficient time for processing after reading the header, to allow some tolerance in the position of the subsequent VFO3, and to test laser power when a recording is made.

The data part comprises VFO3, a sync field, data field, the postamble PA2 and a buffer field as shown in FIG. 8A. The sync field (4 bytes) is provided so that the unit achieves byte synchronization for the following data field, and it has a predetermined pattern.

The data field is provided to record user data. For user data, 2048 bytes are available, and when parity, etc,, is also recorded for error detection and correction, this becomes 2498 bytes.

A resync pattern for obtaining sync with a predetermined position, not shown, is provided in the data field, The buffer field is used as a permitted range for electrical or mechanical errors.

2. Construction of Drive Unit

The construction of the drive unit of this example will now be described referring to FIGS. 1–4.

Figure 1:
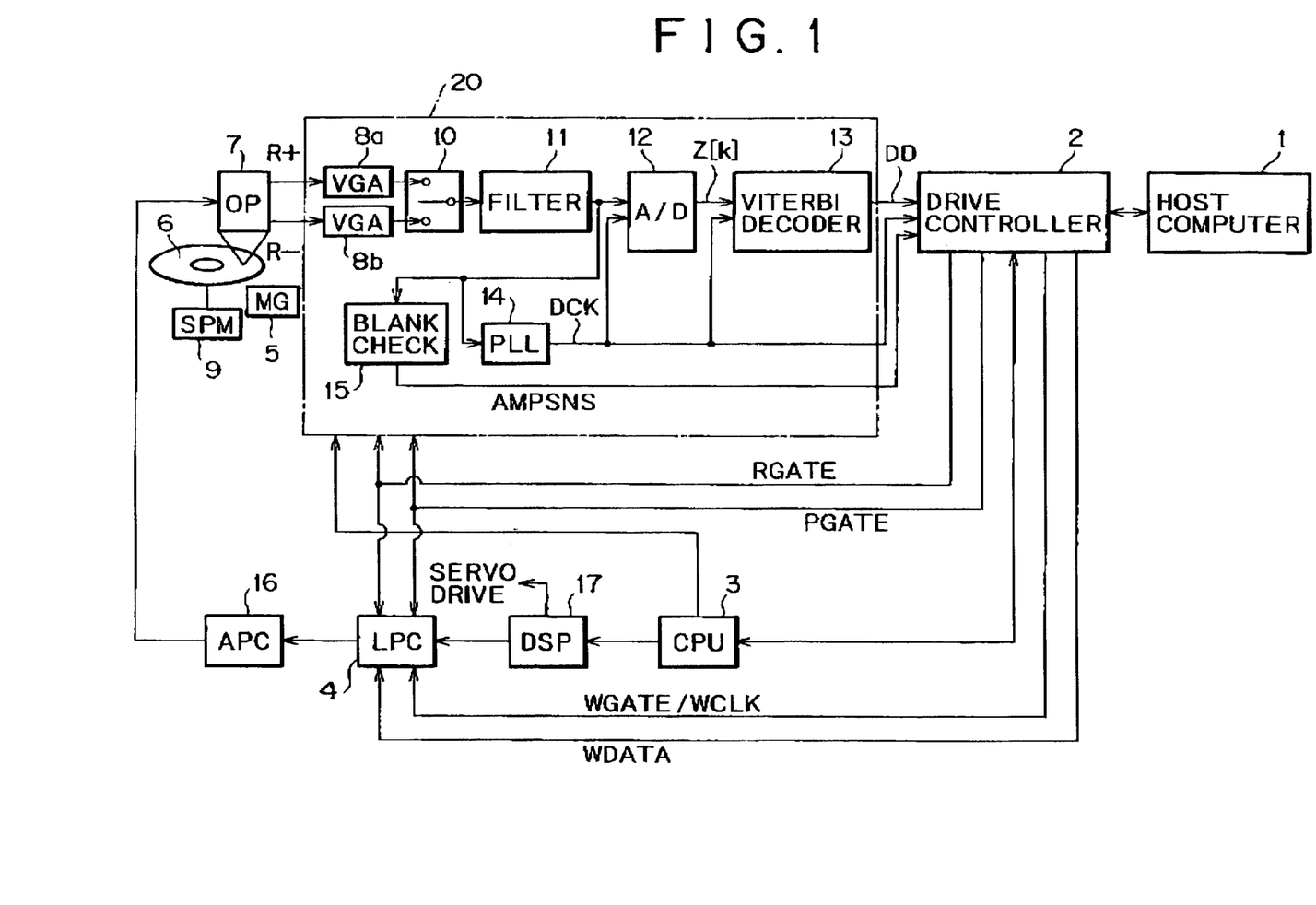
FIG. 1 is a block diagram of a drive unit according to one embodiment of this invention.

FIG. 1 is a block diagram of a recording/reproduction unit according to this example. This block diagram mainly shows the recording/reproduction signal processing system, and a servo system and other parts are not shown.

The magneto-optic disk 6 which is the recording medium is rotated by a spindle motor 9 in the drive unit, and information is recorded, reproduced or erased by an optical pickup 7 and magnetic head 5, Position control by the optical pickup 7 and magnetic head 5 during recording, reproduction or erasing (seek, tracking servo, thread servo), focus servo of the laser beam from the optical pickup 7 or the rotation servo of the spindle motor 9, are performed by a servo system, not shown.

A drive controller (hereafter referred to as controller) 2 performs various controls as the master controller of this drive unit, and is the part which communicates with a host computer 1. In other words, the controller 2 controls the recording of supplied data on the disk 6 according to a recording command from the host computer 1. It also controls readout of required data from the disk 6 and transfer to the host computer 1, according to a command from the host computer 1.

A CPU3 controls various parts for recording and reproduction based on instructions from the controller 2.

For example, it performs various controls on an RP block 20 of the reproducing system, and issues commands to DSP17 which functions as a servo processor.

In recording, the controller 2 receives user data to be recorded according to a command from the host computer 1, encodes it based on user data information words, and for example generates a RLL (1, 7) code as a codeword. This codeword is supplied as recording data WDATA to a laser power controller part (hereafter referred to as LPC) 4.

The controller 2 also specifies light emission and timing as a recording mode to LPC4 in the form of a signal WGATE. It also generates a recording clock WCLK as a reference for recording operations, and supplies it to LPC4.

LPC4 generates a laser drive signal (drive pulse) so that a laser output is obtained from the optical pickup 7 in reproduction, recording and erasing.

This drive pulse is supplied to an APC (Auto Power Control) and drive part (hereafter referred to as APC part) 16. The APC part 16 applies a current to a laser diode according to the drive pulse so that a laser output is obtained from the laser diode in the optical pickup 7. The laser emission level in reproduction, recording and erasing, i.e., the drive pulse value of the laser, is set according to an instruction of DSP17 (CPU3).

When recording is specified by the signal WGATE, LPC4 causes a laser output to be generated by generating a drive pulse corresponding to the supplied recording data WDATA and recording clock WCLR, and performs recording by forming a mark sequence (bit sequence) having a magnetic polarity on the magneto-optic disk 6. During this recording, the magnetic head 5 gives a bias field to the magneto-optic disk 6.

In reproduction (normal reproduction, and data readout to perform verify in write-and-verify), the following operations are performed due to control by the controller 2 and CPU3.

The controller 2 supplies a signal RGATE and a signal PGATE to LPC4 and the RF block 20 to perform reproduction control.

Due to the signal RGATE, the controller 2 instructs LPC4 to emit light continuously by reproduction level laser power, and instructs the RF block 20 to perform reproduction.

The sector formatting of the disk 6 comprises the header (area where an address, etc., is recorded by an emboss pit), and a data part (MO area where user data or the like is recorded by magneto-optical recording). The signal PGATE specifies the timing by which operations are performed in these areas, and LPC4 and the RF block 20 operate according to this timing.

In reproduction, LPC4 first generates a drive pulse according to the signal RGAT, and causes a laser output for reproduction from the optical pickup 7.

The optical pickup 7 irradiates the magneto-optic disk 6 with a laser beam, and receives the reflected light which is produced. Various signals are also generated by computational processing of signals according to the reflected light amount. These comprise a sum signal R+, difference signal R−, and a focusing error signal and tracking error signal, not shown.

The sum signal R+ is supplied to a change-over switch 10 after gain adjustment by a variable gain amplifier 8a. The difference signal R− is supplied to the change-over switch 10 after gain adjustment by a variable gain amplifier 8b. The gain settings of the variable gain amplifiers 8a, 8b are performed by the CPU3.

The focusing error signal and tracking error signal are not shown, but are supplied to the DSP17, and used for control of the servo system by the DSP17.

In the change-over switch 10, a change-over is made according to the signal PGATE so that the sum signal R+ or difference signal R− is supplied to a filter 11. Specifically, in the sector formatting of the magneto-optic disk 6, the sum signal R+ is supplied to the filter 11 in the time during which the signal reproduced from the header (address part) formed by embossing is supplied to the changeover switch 10. Likewise, the difference signal R− is supplied to the filter 11 in the time during which the signal reproduced by the MSR scheme from the data part in which recording is performed magneto-optically is supplied to the change-over switch 10.

The filter 11 comprises an RF effective bandwidth boost circuit, a low pass filter which cuts noise, and a waveform equalizer which performs waveform equalization. The input signals are equalized so that partial response characteristics suited to the Viterbi decoding performed by a Viterbi decoder 13, are obtained.

An A/D converter 12 performs A/D conversion on the output of the filter 11 according to a reproduction clock DCK, and a reproduction signal value $z[k]$ is output.

Based on the reproduction signal value z, the Viterbi decoder 13 generates decoded data DD by Viterbi decoding. This decoded data DD is a maximum likelihood sequence with respect to the recorded data. Therefore, when there is no decoding error, the decoded data DD coincides with the recorded data.

The decoded data DD is supplied to the controller 2. The recorded data comprises codewords generated by encoding such as channel encoding from the user data. Therefore, if the decoding error rate is sufficiently low, the decoded data DD may be considered as recorded data in the form of codewords. The controller 2 reproduces the user data by performing decode processing corresponding to encoding such as the aforesaid channel encoding on the decoded data DD. This may for example be (1-7) RLL (Run Length Limited) decode processing, or ECC decode processing.

The reproduction clock DCK for this data read processing is generated by a PLL part 14. Specifically, the output of the filter 11 is supplied also to the PLL part 14, and the PLL part 14 generates the reproduction clock DCK by a PLL operation relative to the supplied signal.

The reproduction clock DCK is supplied to the controller 2, A/D converter 12 and Viterbi decoder 13, the operation of these units being performed with a timing according to the reproduction clock DCK.

The output of the filter 11 is also supplied for example to a blank check circuit 15. The blank check circuit 15 is provided to identify, from the envelope of the RF signal, whether the sector being read is blank or written, and supplies identifying information AMPSNS to the controller 2.

Figure 2:
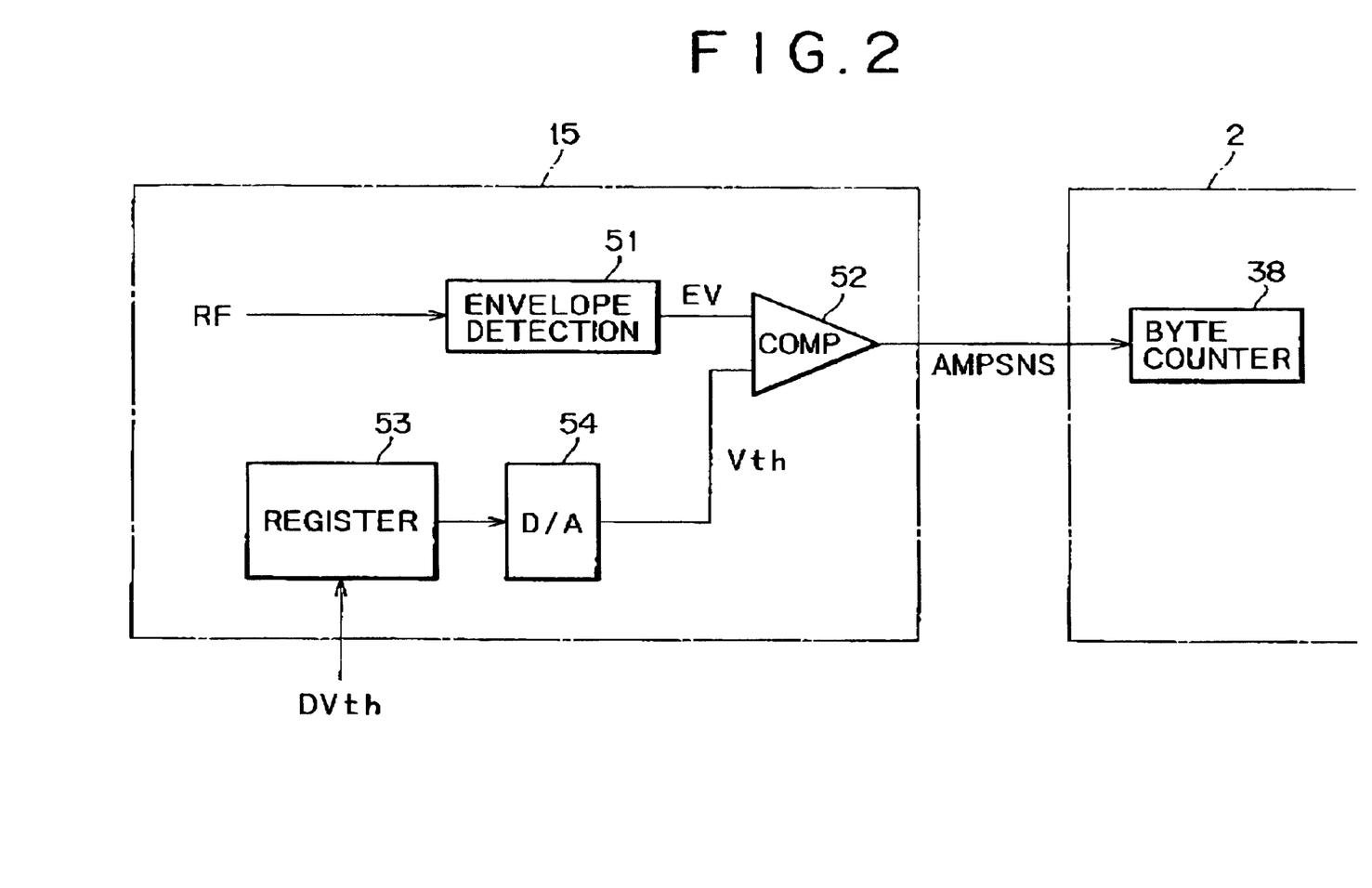
FIG. 2 is a block diagram of a blank check circuit according to this embodiment.
Figure 3:
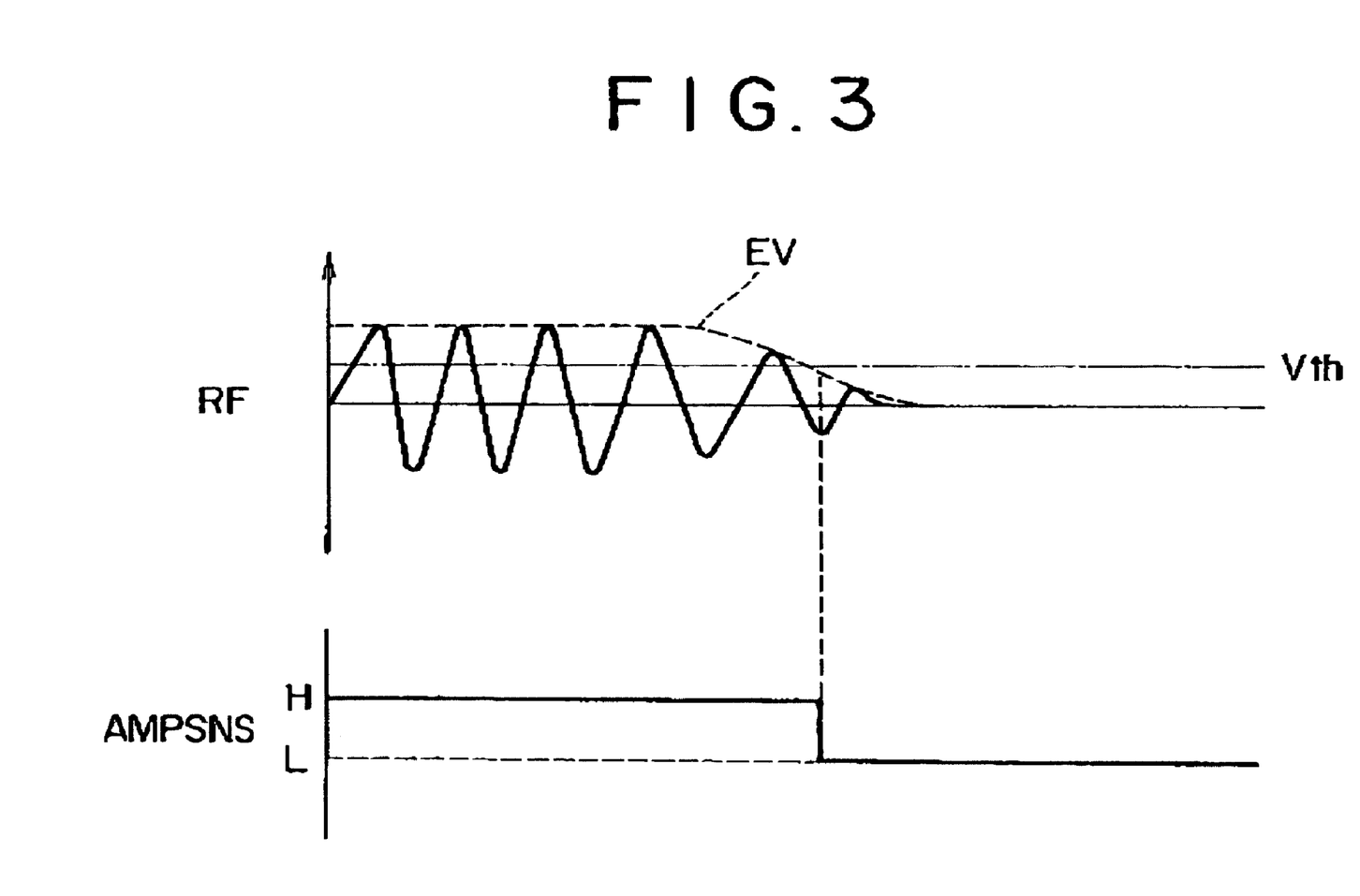
FIG. 3 is a diagram describing the action of the blank check circuit according to this embodiment.

The construction and operation of the blank check circuit 15 are shown in FIGS. 2 and 3.

The RF signal from the filter 11 is supplied to an envelope detecting circuit 51 in the blank check circuit 15, and an envelope EV is supplied to a comparator 52. At the same time, a comparison reference value Dvth is set in a register 53. For example, DPS17 loads the comparison reference value to perform the blank check in the register 53 according to an instruction from the controller 2 (CPU3). The setting of the comparison reference value relative to the envelope EV can therefore be changed, and it may also be modified according to the situation, i.e., for reproduction and verify, or for MSR data readout and normal data readout.

The comparison reference value DVth is converted to a comparison reference voltage Vth in a D/A converter 54, and supplied to the comparator 52.

The comparison result output of the comparator 52 is the signal AMPSNS, and is supplied to a byte counter 38, described hereafter, in the controller 2.

For example, the RF signal envelope EV and comparison reference voltage Vth are compared as in the upper part of FIG. 3, and AMPSNS signals, for example "H" when data is present and "L" when data is not present, are obtained as in the lower part of FIG. 3.

Next, the internal construction of the controller 2 will be described referring to FIG. 4.

Figure 4:
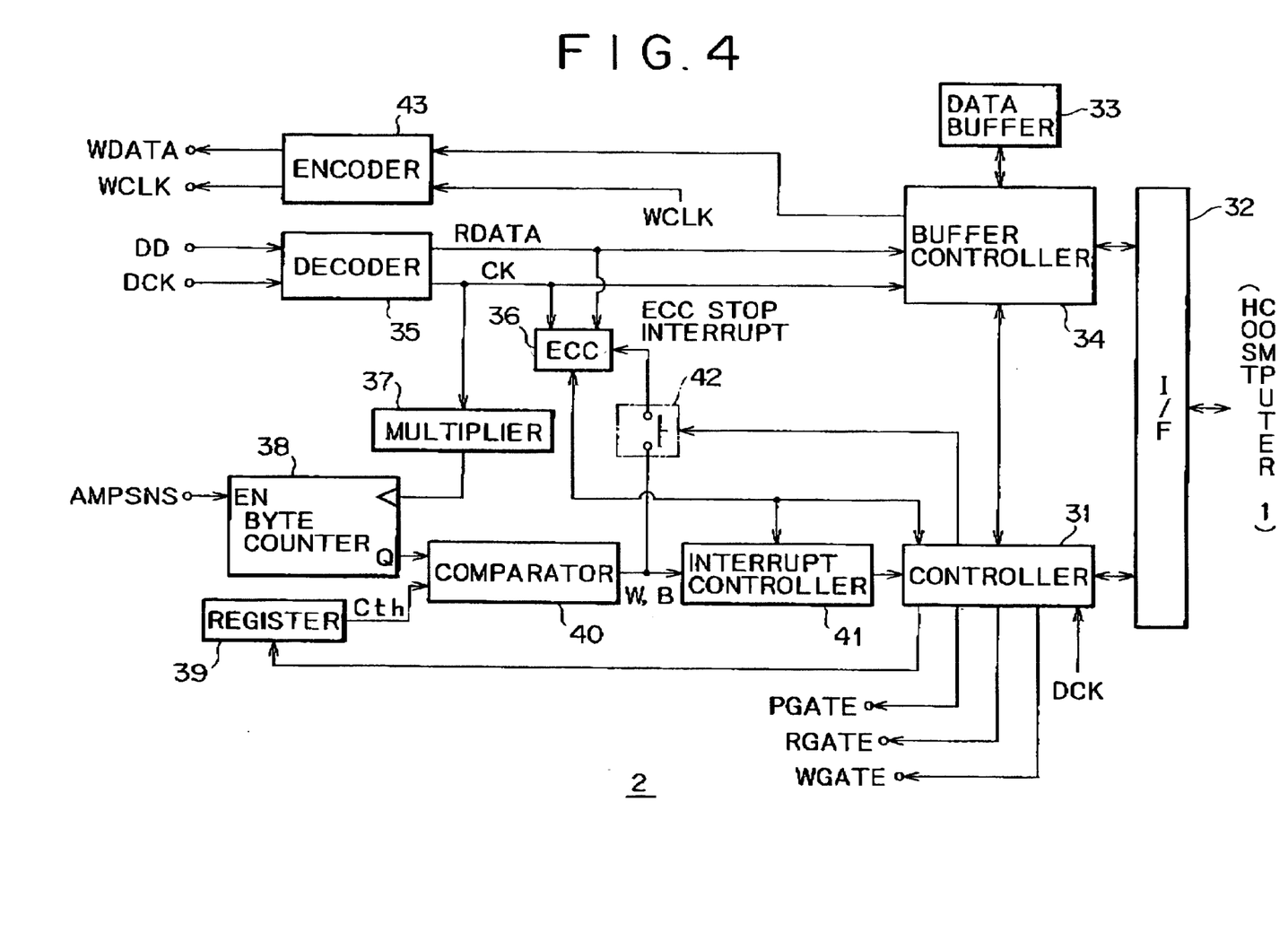
FIG. 4 is a block diagram of a controller according to this embodiment.

As shown in FIG. 4, the controller 2 comprises a controller 31, interface 32, data buffer 33, buffer controller 34, decoder 35, ECC processor 36, multiplier 37, byte counter 38, register 39, comparator 40, interrupt controller 41, ECC stop permission switch 42 (hereafter, referred to simply as "switch"), and encoder 43.

The controller 31 performs the control processing of the controller 2, and also functions as a timing generator for this purpose.

The reproduction clock DCK generated in the PLL part 14 is supplied to the controller 31, and using this reproduction clock DCK, the controller 32 generates signals to control the timing of recording/reproduction operations performed by the unit. These are the signals PGATE, RGATE and WGATE.

The controller 31 also gives necessary instructions for recording and reproduction to parts inside and outside the controller 2.

The interface 32 is the part which performs message exchange with the host computer 1. In other words, recording requests, reproduction requests and reception of recorded data from the host computer 1 specified by the controller 31, take place via the interface 32. Likewise, transmission of reproduced data to the host computer takes place via the interface 32 according to instructions from the controller 31.

The data buffer 33 is a memory which temporarily stores recorded data and reproduced data. Writing and reading to and from the data buffer 33 is performed by the buffer controller 34.

The encoder 43 modulates recorded data taken into the data buffer 33 to produce the recorded data WDATA.

Specifically, when there is a recording request from the host computer, the controller 31 first causes recorded data which has been transmitted to be stored in the data buffer 33 by the buffer controller 34. It then commands recording to be performed by CPU3, LPC4 and a servo system, not shown, and carries out the required seek processing. When recording begins, recorded data stored in the data buffer 33 is transferred to the encoder 43, subjected to error correction coding and (1-7) RLL encoding in the encoder 43, and supplied as the recorded data WDATA to LPC4 as described above.

The decoder 35 performs decode processing on the decoded data DD which is supplied when data is read out (during normal reproduction and verify). A reproduction clock DCE is also supplied for the purpose of this decode processing.

The data RDATA which has been subjected to (1,7) RLL decoding in the decoder 35, then undergoes error correction processing in the ECC (Error Correcting Code) processor 36.

Data which has been passed as OK in error correction processing, is stored in the data buffer 33 as data which has been correctly read out, and transferred as reproduction data to the host computer 1 or used for verify during recording.

The signal AMPSNS from the blank check circuit 15 is used as an enable signal of the byte counter 38. Also, a signal obtained by multiplying a clock CK in the multiplier 37 is supplied as a clock for counting. Therefore, this byte counter 38 counts signals from the multiplier 37 in the "H" interval of the signal AMPSNS. The count value Q is supplied to the comparator 40.

In the register 39, a threshold value Cth is set by the controller, and this threshold value Cth is supplied to the comparator 40.

The comparator 40 obtains the output "H" or "L" as a comparison result W/B, and this output is the blank/written identification result.

Specifically, as described above, the signal AMPSNS is "H" in an interval when data is present. In this interval, count is performed by the byte counter 38, and if the count value Q exceeds a specified value (=threshold value Cth) for a certain sector, it is determined that this sector is written (of course, the identifying logic of the signal AMPSNS and the identifying logic of the comparator may be different).

Therefore, by changing the value of "N" in the multiplication by N performed by the multiplier 37, or the threshold value Cth, the reference for distinguishing blank/written can be changed. The determining reference might be changed according to the status, for example during reproduction and verify, or during MSR data readout and normal readout.

The determining result W/B in the comparator 40 is supplied to the interrupt controller 41. The interrupt controller 41 performs various error controls such as setting interrupt priorities depending on the extent of errors, or storing content. Information relating to these errors is finally transmitted to the controller 31.

When the switch 42 is ON, the identification result W/B is also supplied to the ECC processor 36.

If the identification result W/B is blank with respect to the ECC processor 36, the result becomes an interrupt signal which commands ECC processing to stop.

The ON/OFF of the switch 42 is controlled by the controller 31.

3. Readout Processing

Data readout processing in a drive unit having the aforesaid construction will now be described referring to FIG. 5. Specifically, this processing refers to normal reproduction based on a read command, or readout for verifying in write-and-verify.

Figure 5:
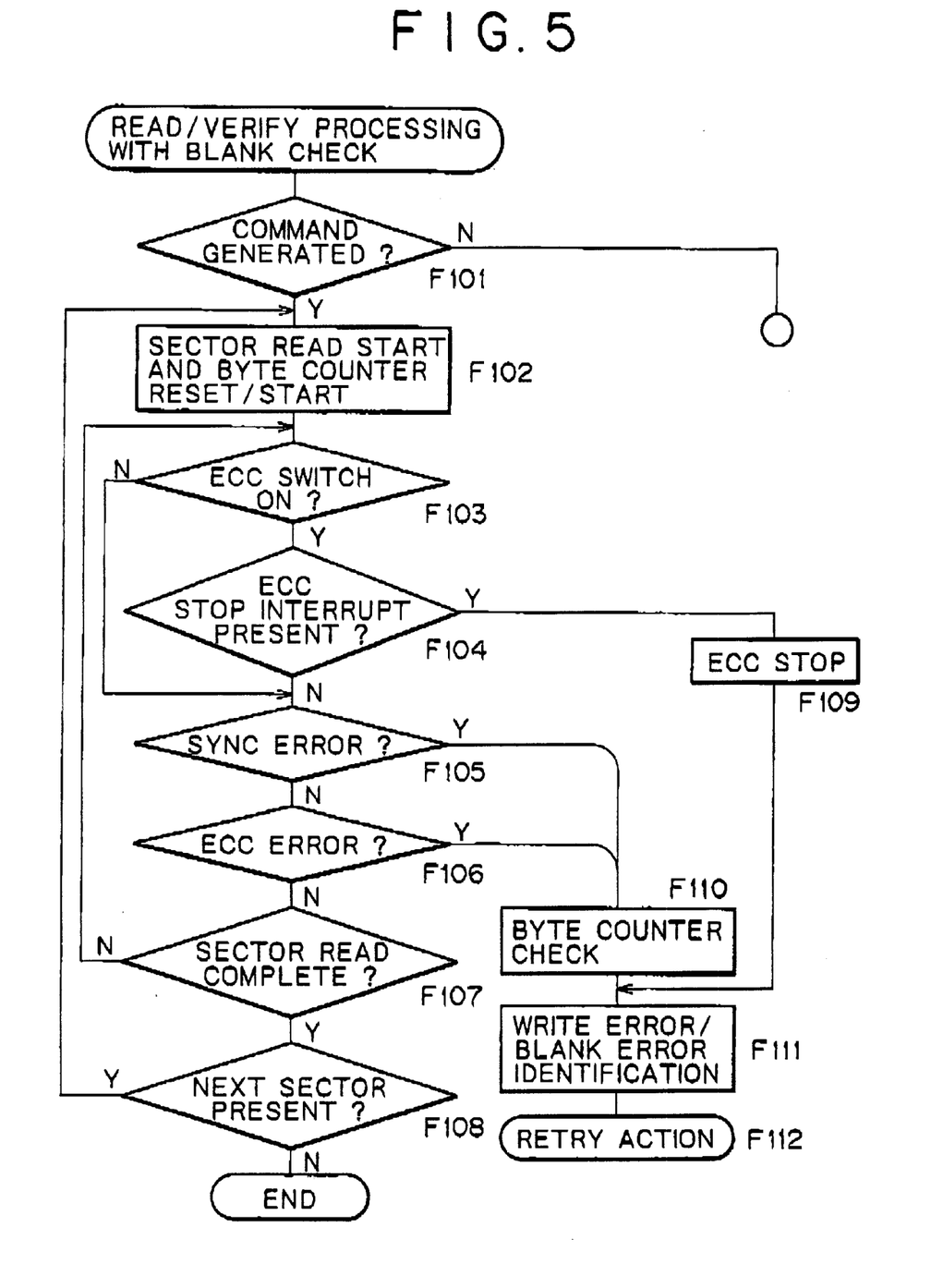
FIG. 5 is a flow chart of the processing performed during data readout according to this embodiment.
Figure 6:
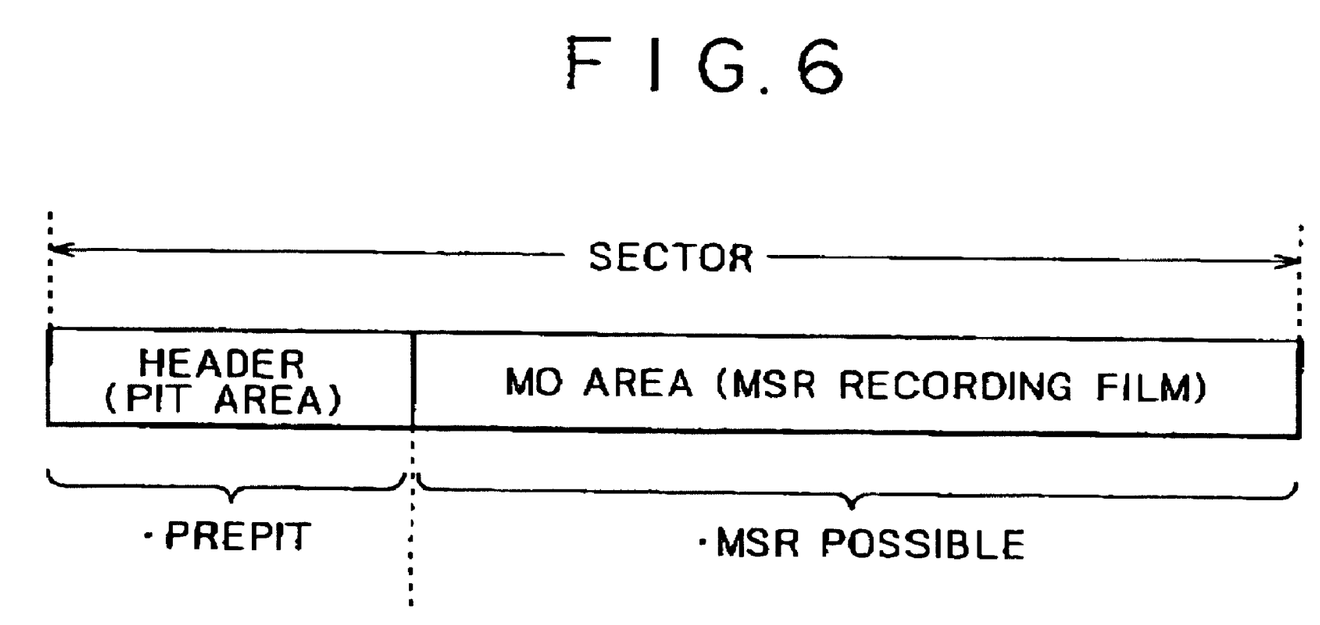
FIG. 6 is a descriptive diagram of sectors on an MO disk.

When a command (read command or verify command) relating to information readout from the host computer 1 is issued, the processing of the controller 2 proceeds to the steps F101, F102 of FIG. 5, and controls the various parts to begin readout of the desired sector from the disk 6 as described hereabove. Decoding by the decoder 35 and ECC processor 36, and buffering to the data buffer 33 then begins in the controller 2.

At the same time, the byte counter 38 is reset and counting is started.

After readout of a certain sector has begun, if the switch 42 is ON, the ECC processor 36 monitors stop interrupt by the identifying result W/B in steps F103, F104. If the switch 42 is OFF, the identifying result W/B is not supplied to the ECC processor 36, and therefore this processing is not performed. The case when the switch 42 must be OFF will be described later.

Errors which occur during decoding are monitored in steps F105, F106. Examples of such errors are when decoding cannot be performed because sync (or resync) of the sector cannot be detected, or ECC errors, i.e., when error correction is impossible.

Provided that there are no decoding errors, and no interrupts occur to stop error correction, the routine proceeds from the step F107 to F108 after sector readout is complete, and if there are other sectors to be readout, the routine returns to the step F102 where the same processing is repeated.

On the other hand, if the necessary sector readout completes and there are no further sectors to be read, readout is terminated by a command from the step F108.

However, if a decoding error occurs during readout of a certain sector, and data readout could not be performed correctly, the routine proceeds to a step F110 and the count value of the byte counter 38 is checked, i.e., blank/written is verified as the identifying result W/B of the comparator 40 in a step F111.

In a step F112, a read retry is performed according to the blank/written identifying result.

When the switch 42 is ON, and a signal indicating blank as the identifying result W/B is supplied to the ECC processor 36 during (ECC) decoding, the ECC processor 36 stops the error correction currently in progress in a step F109.

The controller 31 verifies the written/blank status in the step F111, and a read retry is performed according to the blank/written identifying result in the step F112.

Due to the above processing, the retry operation of this example (step F112) takes place as follows.

When a decoding error (ECC error or sync detection error) occurs for a certain sector, the retry operation differs according to whether the readout is taking place during reproduction or during verity, and is also different depending on whether the sector is blank or written.

First, when a sector for which an error has occurred is written, readout cannot take place although information has been recorded on the sector. Therefore, retry comprises some means to avoid the error such as changing the setting of the readout system so that a retry can be made. Specifically, this may involve changing the gain setting of the variable gain amplifiers 8a, 8b, the boost of the filter 11, or the equalization setting to perform a retry, or shifting the readout clock timing to perform a retry.

If the error occurred during normal reproduction, retries are performed up to a certain number of times while changing the settings, and if readout is completed correctly in a certain retry, readout of the sector is completed as part of normal processing. On the other hand if an error continues to occur even when the maximum number of retries is performed, an error is notified to the host computer 1 to the effect that readout is impossible.

If the error occurred during verify, retries are performed up to a certain number of times while changing settings as described above, but in this case, as there is also a possibility that write was not performed correctly, a retry starting from a write operation may be considered.

If it is determined that the sector for which an error occurred is blank, no information is recorded on the sector. However, as there is also a possibility that a written sector may be incorrectly detected as blank, the gain of the variable gain amplifiers 8a, 8b may be increased (or the boost of the filter 11 may be increased) to retry the read, and decoding performed while blank/written is determined again during the retry. If it is still determined that the sector is blank, a blank sector is notified to the host computer 1. If decoding completes during the retry, readout is completed by the retry.

On the other hand, if a decoding error is again obtained but it is determined that the sector is written during the retry, the retry operation is repeated assuming the sector is a written sector.

If it is determined that a sector for which an error occurs is blank, and this occurs during verify, the fact that the sector is blank means that the write operation was not correctly performed, so a retry is performed starting from the write operation.

In this way, for example, the various retries in the step F112 are performed according to the blank/written status of the sector and according to commands, and in this example, blank/written can be immediately identified when a decoding error occurs.

In other words, when readout of a sector is performed, counting by the byte counter 38 begins simultaneously, and written/blank is distinguished at a certain point in time as the identifying result WIB from the comparator 40.

Therefore, when an error occurs, the controller 2 can immediately identify the blank/written status, and can perform a suitable retry accordingly. As this retry is performed once, there is no need to access the sector twice as in the prior art, and the time required for retry can be considerably shortened. By shortening the time required for retry, the maximum number of retries can also be set large, and therefore there is a strong possibility that decoding will be successful. This enhances the read performance of the drive unit.

In this example, if the switch 42 is ON, ECC processing is stopped when a blank identifying result is obtained even if ECC processing is being carried out for a certain sector. Thus, error correction is not performed uselessly for blank sectors, i.e., for sectors which cannot be decoded, and further, an error can be notified to the host computer 1 or a retry operation performed without waiting for a decoding error to occur. In other words, errors can be dealt with very rapidly.

This function is especially convenient in the case of the MSR reproduction described above. In the case of this MSR reproduction, suitable heating by the laser spot or a bias field is required, but if a proper MSR effect cannot be obtained due to these conditions, for example, the RF signal amplitude is of the same order as that of the erase (i.e., blank) state. This may occur when for example laser power is insufficient during readout or a blank occurs due to a defect in a sector. In such a case, by stopping ECC processing due to blank detection and immediately performing a retry, processing can be performed rapidly.

The switch 42 may be left OFF and ECC stop not implemented in the following cases.

When the blank/written status of a sector is known to be unsure, such as for example a sector recorded by a write power presumed to be unsuitable during a write test, ECC processing must be performed to detect the recording status of the sector even if it was provisionally determined as blank.

There are also cases when ECC processing must be completed depending on the processing algorithm, and in this case ECC processing must not be stopped.

Due to these factors, it is convenient to provide the switch 42 so that the ECC processing stop function due to blank sector detection can be canceled. If the ECC processing spot function due to blank detection is canceled, the weighting of the blank/written result must be changed as regards interrupt processing based on blank/written detection, and this kind of processing is performed as internal processing of the controller 41.

Hereabove, one embodiment of this invention has been described, but the invention is not limited to this embodiment and various modifications may be envisaged.

Also, a recording/reproduction unit for magneto-optic disks was described, but this invention can also be applied to drive units used for other recording media (e.g., DVD-RW, DVD-RAM, CD-RW, CD-R, WORM, etc.).

As will be understood from the above description, if an error occurs during decoding of readout information, the result of blank/written identification performed at the same time as decoding is verified, and retries are performed according to this identification result. In other words, by performing the blank check concurrently with decoding of readout data, the blank check status can immediately be identified if a decoding error occurs. This makes it possible to perform suitable retry operations accordingly, and rapid retries can therefore be made.

Further, as the time required for a retry operation is shortened, the maximum number of retries can also be set large, and the read performance of the drive unit can be improved.

Further, according to this invention decoding by the decoding means is stopped when a certain area is identified as a blank region by the identifying means. As a result, error correction is not needlessly performed in the decoding of the blank part, and efficient operations such as rapid error notification are therefore possible. In this way, the response of the unit is enhanced.

What is claimed is:

1. A drive unit comprising:
    head means for reading information from a recording medium,
    decoding means for performing decoding and error correction on information read by said head means,
    identifying means for identifying whether the information is information from a written area or a blank area on the recording medium when processing is performed by said decoding means on information read by said head means, and
    control means for verifying the identification result of said identifying means when an error occurs in processing by said decoding means, and performing retries according to said identification result,
    wherein said identifying means comprises:
        means for detecting the envelope of an RF signal read by said head means,
        means for setting an envelope comparison reference voltage,
        envelope comparison means for comparing an envelope signal, which is output by said detecting means, and the envelope comparison reference voltage,
        means for multiplying a reproduction clock signal,
        counting means for counting a comparison signal output by said comparison means by using said multiplied reproduction clock signal,
        means for setting a blank/written identification reference value, and
        blank/written count comparison means for comparing the output of said counting means with said set blank/written identification reference value.

2. A drive unit as claimed in claim 1, further comprising means for causing said error correction by said decoding means to be stopped when a blank area identification result is obtained by said identifying means.

3. Control means as claimed in claim 1, wherein the identification result of said identifying means is used as an interrupt signal when the identifying result identifies information from a blank area.

4. A method for use in a drive unit that utilizes a head means to read information from a recording medium, comprising the steps of:
    decoding and error correcting information read by said head means;
    identifying whether the read information is information from a written area or a blank area on the recording medium; and
    verifying an identification result of said identifying step when an error occurs in decoding processing, and performing retries according to said identification result;
    wherein said identifying comprises:
        detecting the envelope of an RF signal read by said head means;
        setting an envelope comparison reference voltage;
        comparing an envelope signal of the detected envelope and the envelope comparison reference voltage;
        multiplying a reproduction clock signal;
        counting a comparison signal output in said comparing step with the use of said multiplied reproduction clock signal;
        setting a blank/written identification reference value; and
        comparing a count of said counting step with said set blank/written identification reference value.

* * * * *